(12) United States Patent
Zheng et al.

(10) Patent No.: US 10,420,034 B1
(45) Date of Patent: Sep. 17, 2019

(54) SYSTEMS AND METHODS FOR ADAPTIVELY CONTROLLING UPLINK COMMUNICATIONS PARAMETERS BY AN ACCESS POINT

(71) Applicant: Marvell International Ltd., Hamilton (BM)

(72) Inventors: Xiayu Zheng, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/005,104

(22) Filed: Jun. 11, 2018

Related U.S. Application Data

(60) Provisional application No. 62/517,707, filed on Jun. 9, 2017.

(51) Int. Cl.
| | |
|---|---|
| *H04W 52/14* | (2009.01) |
| *H04W 52/24* | (2009.01) |
| *H04W 72/08* | (2009.01) |
| *H04W 84/12* | (2009.01) |
| *H04W 72/04* | (2009.01) |
| *H04W 52/36* | (2009.01) |
| *H04W 52/26* | (2009.01) |

(52) U.S. Cl.
CPC ....... *H04W 52/146* (2013.01); *H04W 52/242* (2013.01); *H04W 52/245* (2013.01); *H04W 52/246* (2013.01); *H04W 52/267* (2013.01); *H04W 52/365* (2013.01); *H04W 72/042* (2013.01); *H04W 72/085* (2013.01); *H04W 84/12* (2013.01)

(58) Field of Classification Search
CPC ............ H04W 52/146; H04W 52/242; H04W 52/245; H04W 52/246; H04W 52/267; H04W 52/365; H04W 72/042; H04W 72/085; H04W 84/12
See application file for complete search history.

(56) References Cited

U.S. PATENT DOCUMENTS

| | | | | |
|---|---|---|---|---|
| 2004/0063455 | A1* | 4/2004 | Eran | H04J 13/0048 455/525 |
| 2005/0152321 | A1* | 7/2005 | Maufer | H04W 52/04 370/338 |
| 2008/0102845 | A1* | 5/2008 | Zhao | H04W 72/085 455/450 |
| 2008/0212542 | A1* | 9/2008 | Kung | H04W 36/0005 370/336 |
| 2009/0286496 | A1* | 11/2009 | Yavuz | H04W 52/241 455/127.1 |

(Continued)

*Primary Examiner* — Dominic E Rego

(57) ABSTRACT

Embodiments described herein provide methods and systems for adaptively controlling uplink communications parameters of a receiving station by an access point. In some embodiments, the uplink power and/or uplink rate of a receiving station is controlled by the access point based on uplink RSSI and/or SNR measurements of uplink packets sent by the receiving station to the access point. For example, the access point may adjust a target RSSI value based on the uplink RSSI and/or SNR measurements of uplink packets in the allocated resource unit. The adjusted target RSSI value is sent to the receiving station in a trigger frame from the access point and the receiving station may then set the uplink transmission power based on the target RSSI value.

20 Claims, 4 Drawing Sheets

(56) References Cited

U.S. PATENT DOCUMENTS

| | | | |
|---|---|---|---|
| 2010/0238895 A1* | 9/2010 | Nakatsugawa | H04W 16/14 370/329 |
| 2013/0225223 A1* | 8/2013 | Nukala | H04W 52/241 455/522 |
| 2014/0036691 A1* | 2/2014 | Madan | H04W 24/10 370/242 |
| 2014/0059218 A1* | 2/2014 | Ganu | H04W 12/08 709/224 |
| 2016/0007359 A1* | 1/2016 | Kim | H04W 28/0205 370/232 |
| 2016/0219475 A1* | 7/2016 | Kim | H04L 5/00 |
| 2016/0374093 A1* | 12/2016 | Asterjadhi | H04W 28/0278 |
| 2017/0126293 A1* | 5/2017 | Chen | H04B 7/0452 |
| 2017/0264354 A1* | 9/2017 | Ghosh | H04B 7/0452 |
| 2017/0295512 A1* | 10/2017 | Rangaswamy | H04W 28/08 |
| 2017/0303276 A1* | 10/2017 | Cheng | H04B 17/309 |
| 2017/0317726 A1* | 11/2017 | Abdallah | H04B 17/318 |
| 2017/0331605 A1* | 11/2017 | Shani | H04L 5/0048 |
| 2018/0310240 A1* | 10/2018 | Kannan | H04W 48/20 |

\* cited by examiner

US 10,420,034 B1

SYSTEMS AND METHODS FOR ADAPTIVELY CONTROLLING UPLINK COMMUNICATIONS PARAMETERS BY AN ACCESS POINT

CROSS-REFERENCE TO RELATED APPLICATION

This disclosure claims the benefit under 35 U.S.C. § 119(e) of U.S. Provisional Patent Application No. 62/517,707, filed Jun. 9, 2017, which is hereby incorporated by reference herein in its entirety.

FIELD OF USE

This disclosure relates to data transmission protocols in 802.11 wireless local area networks, and specifically, to systems and methods for adaptively controlling uplink communications parameters of a receiving station by an access point.

BACKGROUND

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In typical orthogonal-frequency-division-multiple-access (OFDMA) systems that use the 802.11ax uplink multi-user protocol, uplink communication channel resources are allocated by an access point to control the overall uplink throughput. For example, the access point may allocate the data rate, transmission power, resource unit size and location to each receiving station (i.e., non-access-point station). In some cases, the access point may set the values for the communication channel resources based on data received from one or more receiving stations. However, these systems do not take into account or consider partially signal quality information (e.g., signal-to-noise ratio (SNR) or received-signal-strength-information (RSSI)) in setting the values for the communication channel resources. This results in non-optimal uplink throughput and waste of resources.

SUMMARY

Embodiments described herein provide a method for an access point to adaptively control uplink communications parameters of a receiving station. An uplink packet may be received, at the access point from the receiving station, an uplink packet. An uplink received-signal-strength-indicator (RSSI) value and an uplink signal-to-noise ratio (SNR) value are computed based on the received uplink packet. At least one uplink communications parameter may be adjusted based on the computed uplink RSSI and uplink SNR values. A trigger frame may be transmitted to the receiving station. The trigger frame i) indicates the adjusted at least one uplink communications parameter and ii) causes the receiving station to adjust the at least one uplink communications parameter in data transmissions to the access point.

In some implementations, the uplink communications parameter includes at least one of a target RSSI value, a rate, resource unit size, and resource unit location.

In some implementations, the receiving station is caused to compute a current uplink transmission power, for transmitting signals to the access point, based on the target RSSI value by retrieving from the trigger frame a downlink transmission power corresponding to a power used by the access point to transmit signals to the receiving station, computing a downlink RSSI value based on the trigger frame, computing a pathloss value based on a difference of the downlink transmission power and the downlink RSSI value, and computing the current uplink transmission power based on a sum of the pathloss value and the target RSSI value. The receiving station is caused to compute an uplink headroom value based on a difference of a maximum transmission power of the receiving station and the current uplink transmission power value. The uplink power headroom value is received, at the access point, from the receiving station.

In some implementations, the adjusted at least one uplink communications parameter corresponds to an uplink transmission power. The availability to reduce the uplink transmission power corresponding to the at least one uplink communications parameter is determined based on determining that at least one of (a) the uplink RSSI value, computed based on the received uplink packet, is greater than a maximum uplink RSSI value and (b) the uplink SNR value, computed based on the received uplink packet, is greater than an required SNR value of a peak rate. The at least one uplink communications parameter may be reduced by a minimum of a difference between (a) the uplink RSSI value, computed based on the received uplink packet, and the maximum uplink RSSI value and (b) the uplink SNR value, computed based on the received uplink packet, and the required SNR value.

In some implementations, an uplink power headroom value that represents a difference between a maximum uplink transmission power of the receiving station and a current uplink transmission power of the receiving station may be received, at the access point from the receiving station. In response to determining that reducing uplink transmission power is not available, a maximum uplink rate that avoids saturating signals at the access point is searched for and for an amount to increase uplink power without exceeding the uplink power headroom value. The at least one uplink communications parameter is adjusted based on the maximum uplink rate and the amount to increase uplink power.

In some implementations, for each uplink rate of a plurality of uplink rates, a first offset value is computed based a difference between a required SNR value at the uplink rate and the uplink SNR value computed based on the received uplink packet. A second offset value is computed based on a difference between a maximum uplink RSSI value at the uplink rate and the uplink RSSI value computed based on the received uplink packet. Each of the computed first and second offset values may be searched for to identify the maximum uplink rate of the plurality of uplink rates where (a) the second offset value at the maximum uplink rate is greater than or equal to the first offset value at the maximum uplink rate and (b) the uplink power headroom value is greater than or equal to the first offset value at the maximum uplink rate.

In some implementations, in response to determining that the maximum uplink rate is a peak uplink rate, the uplink rate to the peak uplink rate may be set. The amount may be set to increase uplink power to the first offset value at the peak uplink rate. In response to determining that the maximum uplink rate is not the peak uplink rate, the uplink rate is set to the identified maximum uplink rate. The amount is set to increase uplink power to a minimum of the second offset value at the maximum uplink rate and the uplink power headroom value.

In some implementations, in response to determining that modifying uplink transmission power is not available, the uplink SNR value, computed based on the received uplink packet, may be compared to each of a plurality of required SNR values at different respective uplink rates. In response to the comparing, a maximum uplink rate of the uplink rates may be selected where the uplink SNR value, computed based on the received uplink packet, is greater than the required SNR value at the maximum uplink rate. The at least one uplink communications parameter is adjusted based on the maximum uplink rate.

In some implementations, an uplink power headroom value that represents a difference between a maximum uplink transmission power of the receiving station and a current uplink transmission power of the receiving station may be received, at the access point from the receiving station. The uplink power headroom value may be determined to be not positive. Parameters including (a) the uplink RSSI value, computed based on the received uplink packet, may be determined to be less than or equal to a maximum uplink RSSI value and (b) the uplink SNR value, computed based on the received uplink packet, may be determined to be less than or equal to a required SNR value.

In some implementations, the required SNR value comprises a margin SNR value computed based on an error rate of the received uplink packet.

Embodiments described herein include a system for an access point to adaptively control uplink communications parameters of a receiving station. The system includes control circuitry configured to: receive, at the access point from the receiving station, an uplink packet, compute an uplink received-signal-strength-indicator (RSSI) value and an uplink signal-to-noise ratio (SNR) value based on the received uplink packet, adjust at least one uplink communications parameter based on the computed uplink RSSI and uplink SNR values; and transmit a trigger frame to the receiving station, the trigger frame i) indicating the adjusted at least one uplink communications parameter and ii) causing the receiving station to adjust the at least one uplink communications parameter in data transmissions to the access point.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for adaptively controlling uplink communications parameters of a receiving station by an access point. In particular, in some embodiments, the uplink power and/or uplink rate of a receiving station is controlled by the access point based on uplink RSSI and/or SNR measurements of uplink packets sent by the receiving station to the access point. For example, the access point may adjust a target RSSI value based on the uplink RSSI and/or SNR measurements of uplink packets in the allocated resource unit. The adjusted target RSSI value is sent to the receiving station in a trigger frame from the access point and the receiving station may then set the uplink transmission power based on the target RSSI value.

Conventional systems transmit a trigger frame to various receiving stations. This trigger frame includes communication channel resource information (or uplink communications parameters), such as rate and a target RSSI value, which each receiving station uses to set the uplink communications parameters for transmitting signals to the access point. Each receiving station may transmit back to the access point additional channel resource information, such as the uplink power headroom. However, the 802.11ax protocol does not specify an explicit way to set rate and the target RSSI. The access point may not modify the channel resource information sent in the trigger frame properly based on the uplink data packets it received from receiving stations. This results in loss of efficiency in that the uplink throughput is not maximized. In some embodiments, rather than arbitrarily sending the communication channel resource information in the trigger frame, the access point analyzes the uplink power headroom and/or the signal quality (SNR and/or RSSI) of the uplink packets it receives from receiving stations to adjust the communication channel resource information (e.g., the target RSSI value and/or the rate).

Figure 1:
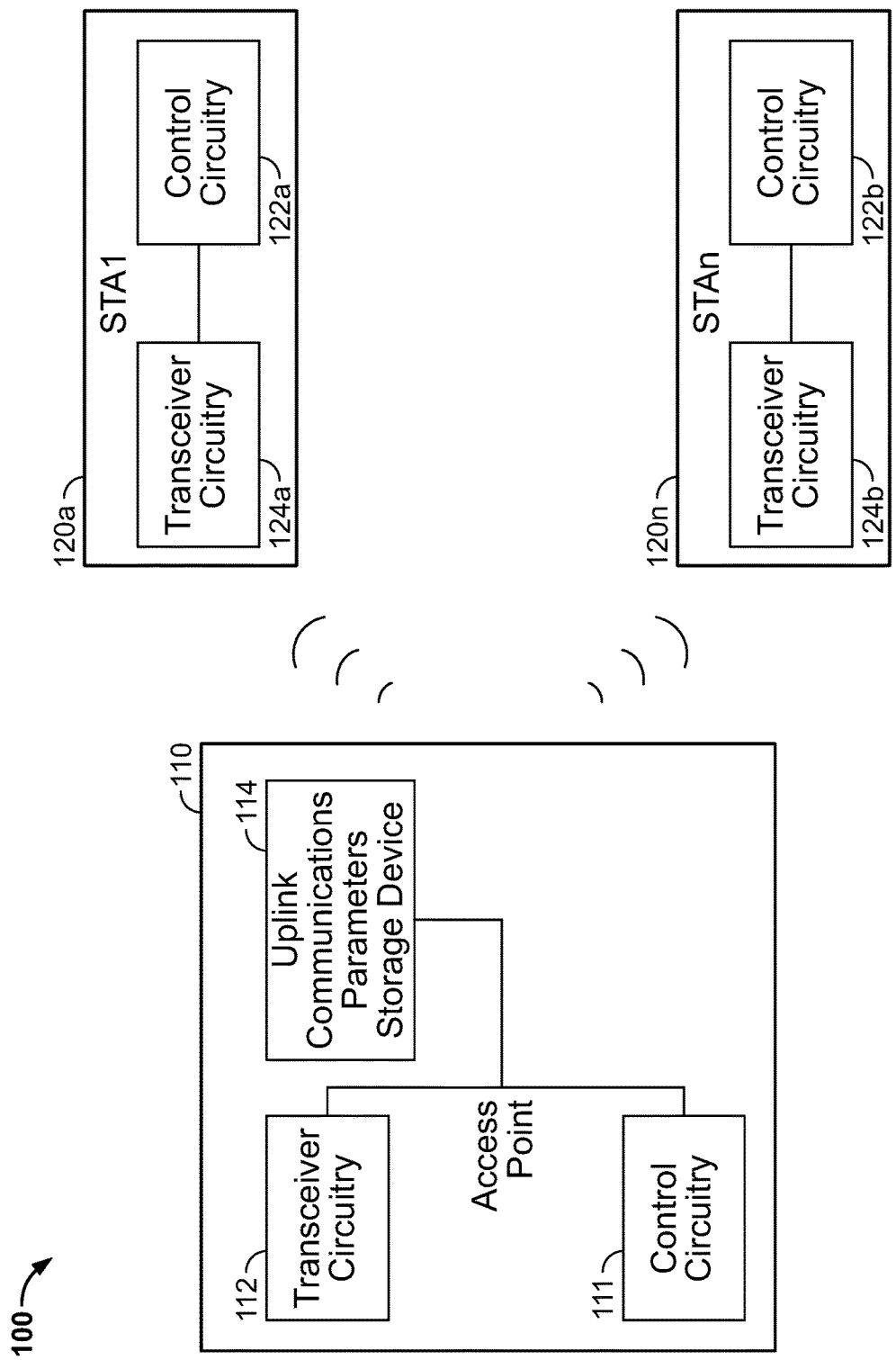
FIG. 1 shows an example of an OFDMA system in accordance with various embodiments.

FIG. 1 shows an example of an OFDMA system 100 in accordance with various embodiments of the disclosure. OFDMA system 100 includes an access point 110 and multiple receiving stations 120a-n. Access point 110 includes control circuitry 111 and transceiver circuitry 112. In some embodiments, transceiver circuitry 112 may be an OFDMA transmission device and/or a MUMIMO transmission device, e.g., configured to implement the 802.11ax protocol. Any operation discussed in this disclosure with respect to access point 110 may be performed in whole or in part by control circuitry 111. In particular, control circuitry 111 may be configured by being programmed through a set of instructions to perform the operations of access point 110 and may instruct other components of access point 110 (e.g., transceiver circuitry 112, uplink communications parameters storage device 114) to perform the operations discussed in this disclosure. Receiving stations 120a-n include respective transceiver circuitries 124a-b and control circuitries 122a-b. In some embodiments, transceiver circuitries 124a-b may be OFDMA transmission devices and/or a MUMIMO transmission devices, e.g., configured to implement the 802.11ax protocol. Any operation discussed in this disclosure with respect to receiving stations 120a-n may be performed in whole or in part by control circuitries 122a-b. In particular, control circuitries 122a-b may be configured by being programmed through a set of instructions to perform the operations of receiving stations 120a-n and may instruct other components of receiving stations 120a-n (e.g., MUMIMO transceiver circuitries 124a-b) to perform the operations discussed in this disclosure In some implementations, access point 110 communicates simultaneously with each of receiving stations 120a-n through a downlink channel using DL-MUMIMO packets according to the 802.11ax protocol. Each receiving station 120a-n communicates with access point 110 through an uplink channel using UL-MUMIMO packets according to the 802.11ax protocol.

In some embodiments, access point 110 may control the uplink communications parameters of one or more receiving stations 120a-n. For example, access point 110 may control the uplink transmission power, uplink rate, resource unit (RU) size and/or RU location of a receiving station. In some implementations, the uplink communications parameters may be computed and set by access point 110 based on uplink signal information received from a given receiving station 120a-n. For example, access point 110 may compute the uplink RSSI and/or SNR values of an uplink packet access point 110 receives from receiving station 120a. Access point 110 may also determine uplink power headroom from the uplink packet received from receiving station 120a. Access point 110 may then adjust one or more uplink communications parameters (e.g., uplink transmission power and/or rate) of receiving station 120a based on the uplink RSSI value, SNR value, and/or the uplink power headroom.

In some implementations, the uplink communications parameters of each receiving station 120a-n may be controlled by access point 110 using a trigger frame transmitted simultaneously to receiving stations 120a-n. In particular, the trigger frame may include a user information field with uplink communications parameters for each receiving station 120a-n. For example, the uplink transmission power of receiving stations 120a may be adjusted based on a target RSSI value (Target$^u_{RSSI}$) in the user information field of the trigger frame for receiving station 120a. Similarly, the uplink transmission rate of receiving stations 120a may be set based on modulation and coding set (MCS) and spatial stream (SS) allocation fields in the user information field of the trigger frame for receiving station 120a. Also, the uplink transmission power of another receiving stations 120n may be adjusted based on a target RSSI value (Target$^u_{RSSI}$) in the user information field of the trigger frame for receiving station 120n. Similarly, the uplink transmission rate of receiving stations 120n may be set based on modulation and coding set (MCS) and spatial stream (SS) allocation fields in the user information field of the trigger frame for receiving station 120n. The uplink transmission power and/or rate and any other uplink communications parameters may differ for each receiving station 120a-n.

In some embodiments, in order to adjust the uplink communications parameters of each receiving station 120a-n, access point 110 may transmit a trigger frame. Specifically, access point 110 may first obtain medium access. Access point may then perform resource allocation and set the uplink communications parameters (e.g., resource allocation) of each receiving station 120a-n and transmit simultaneously to each receiving station 120a-n a downlink trigger frame with the uplink communications parameters. The downlink trigger frame includes a common information field that specifies the downlink transmission power (Tx$^{AP}_{pwr}$) used by access point 110 to transmit the trigger frame.

Each receiving station 120a-n, upon receiving the trigger frame, sets its uplink transmission power based on the target RSSI value specified in the user information field of the trigger frame. In particular, receiving station 120a computes the average downlink pathloss (PL$^u_{DL}$) over the receiving antennas based on an RSSI measurement. For example, receiving station 120a retrieves the downlink transmission power (Tx$^{AP}_{pwr}$) of the access point used in transmission of the trigger frame from the common information field and computes the downlink RSSI (DL$^u_{RSSI}$) of the received trigger frame using, for example, a preamble of the trigger frame. Receiving station 120a computes a difference between the downlink transmission power (Tx$^{AP}_{pwr}$) and the downlink RSSI (DL$^u_{RSSI}$) to determine the average downlink pathloss (PL$^u_{DL}$). The downlink transmission power (Tx$^{AP}_{pwr}$) is the access point 110 combined transmission power of all the transmission antennas used to transmit the trigger frame normalized to 20 MHz bandwidth. The downlink RSSI (DL$^u_{RSSI}$) is the measured received power from the legacy preamble portion of the trigger frame at receiving station u normalized to 20 MHz bandwidth. In circumstances where receiving station u (e.g., receiving station 120a) includes multiple receiving antennas, the downlink RSSI (DL$^u_{RSSI}$) may be the average over all of the receiving antennas. In particular, receiving station 120a computes the average downlink pathloss in accordance with the following:

$$PL^u_{DL} = TX^{AP}_{pwr} - DL^u_{RSSI} \qquad (1)$$

Each receiving station 120a-n may then compute the combined uplink transmission power as an average across each of the antennas of receiving station 120a-n based on the target RSSI value specified for the given receiving station in the user information field of the trigger frame. For example, receiving station 120a may retrieve the target RSSI value (Target$^u_{RSSI}$) from the trigger frame for receiving station 120a. Receiving station 120a may compute a sum of the average downlink pathloss (PL$^u_{DL}$) and the target RSSI value (Target$^u_{RSSI}$) to determine the uplink transmission power (Tx$^u_{pwr}$) of receiving station 120a. In some cases, uplink transmission power (Tx$^u_{pwr}$) may be referred to as the current uplink transmission power used by receiving station 120a to transmit information to access point 110. In particular, receiving station 120a computes the uplink transmission power (Tx$^u_{pwr}$) in accordance with the following:

$$Tx^u_{pwr} = PL^u_{DL} + Target^u_{RSSI} \qquad (2)$$

In some embodiments, each receiving station may compute an uplink headroom value (HR$^u_{STA}$) for 1 the assigned rate for transmission back to access point 110. In some implementations, the uplink headroom value (HR$^u_{STA}$) may be transmitted to access point 110 via high-efficiency (HE) variant HT control field of a medium-access-control (MAC) header in the HE uplink-multi-user (UL MU) packet. For example, to perform this computation, receiving station 120a may retrieve a maximum uplink transmission power value (Tx$^{MAX,u}_{pwr}$) for the rate specified for receiving station 120a in the MCS value. Receiving station 120a may compute the uplink headroom value (HR$^u_{STA}$) based on a difference of the maximum uplink transmission power value (Tx$^{MAX,u}_{pwr}$) and the computed uplink transmission power (Tx$^u_{pwr}$) (e.g., the current uplink transmission power). In particular, receiving station 120a computes the uplink headroom value (HR$^u_{STA}$) in accordance with the following:

$$HR^u_{STA} = Tx^{MAX,u}_{pwr} - TX^u_{pwr} \qquad (3)$$

In some embodiments, access point 110 may compute the target RSSI value for each receiving station 120a-n based on the uplink data packet access point 110 receives from each receiving station 120a-n. In particular, access point 110 may compute the target RSSI value as a function of the rate, SNR, RSSI and/or uplink headroom value determined from the uplink data packet. In some implementations, access point 110 may compute the target RSSI value in accordance with the following:

$$Target^u_{RSSI} = SNR(k) + NI + NRU\_dB + offset\_AP\_per\_STA^u \qquad (4)$$

where SNR(k) is the SNR requirement (required SNR) per subcarrier, in dB for the currently selected rate k which includes modulation, forward error correction (FEC), and coding rate from a predefined table; NI is the averaged noise floor per subcarrier, in dBm measured at access point 110; NRU_dB is the number of subcarriers per resource unit in dB; and offset_AP_per_STA$^u$ is an access point parameter for a given receiving station 120a-n uplink transmission power offset in dB. In some implementations, NI and NRU_dB are constant and uplink transmission power control is determined by access point 110 as a function of or by adjusting a value of the rate and the offset_AP_per_STA$^u$ parameter.

In some embodiments, the parameters and values for equation (4) may be stored in storage 114. For example, storage 114 may include a rate table with nominal SNR requirements (required SNR values) (SNR(k)) for each rate k. This rate table may be used by access point 110 to adapt the data rate for each receiving station. The rate table may be the same or different for each receiving station and/or resource unit. In some implementations, higher data rates may correspond to higher required SNR values. For example, if a receiving station can support up to two spatial streams (SS), then the rate table may contain only 1SS and 2SS rates. In cases where the receiving station can support up to 4 spatial streams (SS), the rate table may contain 1SS, 2SS, 3SS, and 4SS rates. The rates may be ordered in throughput and selected such that the corresponding nominal required SNR has the same ordering. In some implementations, the nominal required SNR for the rate table may be generated at a packet error rate (PER) of 10% for a 20 MHz PSDU under AWGN (white Gaussian noise) channel with the same access point receiving antennas. The PSDU length may be 2048 octets for BPSK with DCM or 4096 octets for all other modulations.

A receiving station specific parameter SNR margin (SNR$^u_{margin}$) may be maintained to adapt the required SNR value stored in the table based on error statistics of uplink packets received from a given station. In this way, the SNR required for a given rate is set specifically and computed based on the SNR value of a particular receiving station.

In some embodiments, storage 114 may also store a maximum RSSI table for each corresponding rate in the table. The maximum RSSI value (max_RSSI(k)) (UL$_{RSSI,max}$(k)) in the table indicates the maximum allowable uplink RSSI for the rate k at the access point receiving side normalized to the resource unit allocated for the given station u in the uplink OFDMA packet. In some implementations, access point 110 may adjust or increase the target RSSI value (and thereby the uplink power transmission value) of a given receiving station up to a maximum point that avoids uplink transmission packets received by access point 110 to have a received RSSI value that is greater than the maximum RSSI value (max_RSSI(k)) for the selected rate. If the received RSSI value is greater than the maximum RSSI value (max_RSSI(k)) for the selected rate, decoding errors may occur at access point 110.

In some implementations, access point 110 may adapt offset_AP_per_STA$^u$ and the rate to adjust the target RSSI value in a way that maximizes throughput for a particular receiving station. In particular, access point 110 maximizes a given receiving station's throughput by maximizing the uplink transmission power of the receiving station at the mid-far-range up to a maximum point that avoids saturating signals received by access point 110. For example, at close range, access point 110 may control the receiving station's uplink transmission power to avoid saturating signals at access point 110. In cases where the uplink rate is already the peak rate, access point 110 may save a receiving station's power and/or increase the resource unit size of the receiving station.

In some embodiments, when access point 110 receives an uplink OFDMA packet from a given receiving station 120a-n, access point 110 may estimate the uplink RSSI value (UL$_{RSSI}$) and/or the uplink SNR value (UL$_{SNR}$) for each station from which the uplink packet is received or for each resource unit. Access point 110 may then obtain the uplink headroom value for each receiving station or resource unit from the uplink transmission packet (e.g., from the MAC header). Access point 110 may update the SNR margin value for each receiving station based on the error statistic determined after decoding the uplink packet from each receiving station. Access point 110 may then update the offset_AP_per_STA$^u$ parameter and/or rate value for each station to adjust the uplink communications channel parameters (e.g., target RSSI value of equation (4)).

In some embodiments, access point 110 may compute a value for the offset_AP_per_STA$^u$ parameter based on the RSSI, SNR and/or headroom values determined from an uplink data packet received from a given receiving station. In some implementations, access point 110 may first determine whether uplink transmission power of a receiving station may be reduced (e.g., by reducing a value of the target RSSI value sent to that receiving station) based on an RSSI value of a received uplink data packet. To do this, access point 110 may determine whether the uplink RSSI value at the current rate k of the received uplink data packet is greater than the maximum allowable uplink RSSI value for the current rate. Access point 110 may receive an uplink packet from receiving station 120a, compute an RSSI value (UL$^u_{RSSI}$) based on a preamble of the uplink packet, determine the current rate set for receiving station 120a, retrieve from storage 114 the maximum allowable uplink RSSI value for the current rate and compare the retrieved maximum allowable uplink RSSI value for the current rate to the computed RSSI value of the uplink packet received from receiving station 120a. In response to determining that the uplink RSSI value at the current rate k of the received uplink data packet is greater than the maximum allowable uplink RSSI value, access point 110 may determine that the uplink transmission power can be reduced. In such circumstances, access point 110 may compute an RSSI offset value (dOffset$^u_{RSSI}$) for receiving station 120a and reduce the offset_AP_per_STA$^u$ by the computed RSSI offset value. The RSSI offset value may be computed in accordance with the following, where u represents the given receiving station (e.g., receiving station 120a or resource unit) and k represents the current rate of receiving station 120a:

$$d\text{Offset}^u_{RSSI} = \text{UL}_{RSSI,max}(k) - \text{UL}^u_{RSSI} \quad (5)$$

In some embodiments, access point 110 may also determine whether uplink transmission power of a receiving station may be reduced (e.g., by reducing a value of the target RSSI value sent to that receiving station) based on an SNR value at the current rate. In some embodiments, this may only be performed if the current rate is already the peak rate of the receiving station. Access point 110 may receive an uplink packet from receiving station 120a, compute an SNR value of the uplink packet (UL$^u_{SNR}$), determine the current rate set for receiving station 120a, retrieve from storage 114 the nominal required uplink SNR value for the current peak rate, optionally increase the nominal required SNR value by an SNR margin value specific to the receiving station from which the uplink packet was received, and compare the retrieved required uplink SNR value for the current rate to computed SNR value of the uplink packet received from receiving station 120a. In response to determining that the uplink SNR value at the current rate k of the received uplink data packet is greater than the required uplink SNR value (or optionally adjusted uplink SNR value specific to the receiving station), access point 110 may determine that the uplink transmission power can be reduced. In such circumstances, access point 110 may compute an SNR offset value for receiving station 120a and reduce the offset_AP_per_STA$^u$ by the computed SNR offset value. The SNR offset value may be computed in accordance with the following, where u represents the given receiving station (e.g., receiving station 120a or resource unit), SNR$^u_{margin}$ is the optional receiving station specific SNR parameter, and k is the peak rate of receiving station 120a:

$$d\text{Offset}^u_{peak,down} = \text{SNR}(k) + \text{SNR}^u_{margin} - \text{UL}^u_{SNR} \quad (6)$$

In some implementations, access point 110 may reduce offset_AP_per_STA$^u$ parameter by the minimum of dOffset$^u_{RSSI}$ and dOffset$^u_{peak,down}$. In particular, access point 110 may reduce offset_AP_per_STA$^u$ by whichever one of the RSSI or SNR offset values is more negative or greater in absolute terms. In some implementations, access point 110 may only consider and compute dOffset$^u_{peak,down}$ when the peak rate can be used by the receiving station without saturating access point 110 (e.g., if the difference between the required SNR at the peak rate and the uplink SNR value is less than a difference between the allowable maximum RSSI at the peak rate and the uplink RSSI value)

In some embodiments, access point 110 may increase power by adjusting or increasing offset_AP_per_STA$^u$ parameter when the uplink transmission headroom value is positive. In some implementations, access point 110 may only perform this adjustment in response to determining that neither dOffset$^u_{RSSI}$ and dOffset$^u_{peak,down}$ is less than zero (namely that power cannot be decreased). In such circumstances, access point 110 may search the SNR and RSSI values across multiple rates to identify a maximum rate that can be used without saturating signals at access point 110. To perform this search, access point may compute first and second offsets for each rate m.

The first offset may correspond to a difference between the required SNR at the given rate m (optionally adjusted by the SNR margin parameter specific to the receiving station) and the uplink SNR of the uplink packet received from a given receiving station. In particular, the first offset may be computed in accordance with:

$$d\text{Offset}^u_1(m) = \text{SNR}(m) + \text{SNR}^u_{margin} - \text{UL}^u_{SNR} \quad (7)$$

The second offset may correspond to a difference between the maximum allowable RSSI at the given rate m and the uplink RSSI of the uplink packet received from a given receiving station. In particular, the second offset may be computed in accordance with:

$$d\text{Offset}^u_2(m) = \text{UL}_{RSSI,max}(m) - \text{UL}^u_{RSSI} \quad (8)$$

Access point 110 may then search each of the computed first and second offset values to identify a maximum rate m at which the second offset value is greater than or equal to the first offset value and the uplink transmission headroom value is greater than or equal to the first offset at the given rate. In particular, access point 110 identifies a rate that ensures a difference between the required SNR value at that rate and the SNR of the uplink packet at the current rate does not exceed the uplink transmission headroom value and does not exceed a difference between the maximum allowable RSSI at that rate and the RSSI of the uplink packet at the current rate.

Access point 110 may determine whether the identified maximum rate m corresponds to the peak rate. In such circumstances, access point 110 may set a dOffset$^u_{SNR}$ value to the value of the first offset at the peak rate and increase the offset_AP_per_STA$^u$ parameter by the dOffset$^u_{SNR}$ value. Otherwise, access point 110 may set a dOffset$^u_{SNR}$ value to the minimum of the second offset at the maximum rate m that is identified and the uplink transmission headroom value and then increase the offset_AP_per_STA$^u$ parameter by the dOffset$^u_{SNR}$ value if the dOffset$^u_{SNR}$ value is positive.

The above process for access point 110 to adjust the offset_AP_per_STA$^u$ parameter which controls the uplink transmission power of a given receiving station u is further explained below in connection with FIG. 2.

Figure 2:
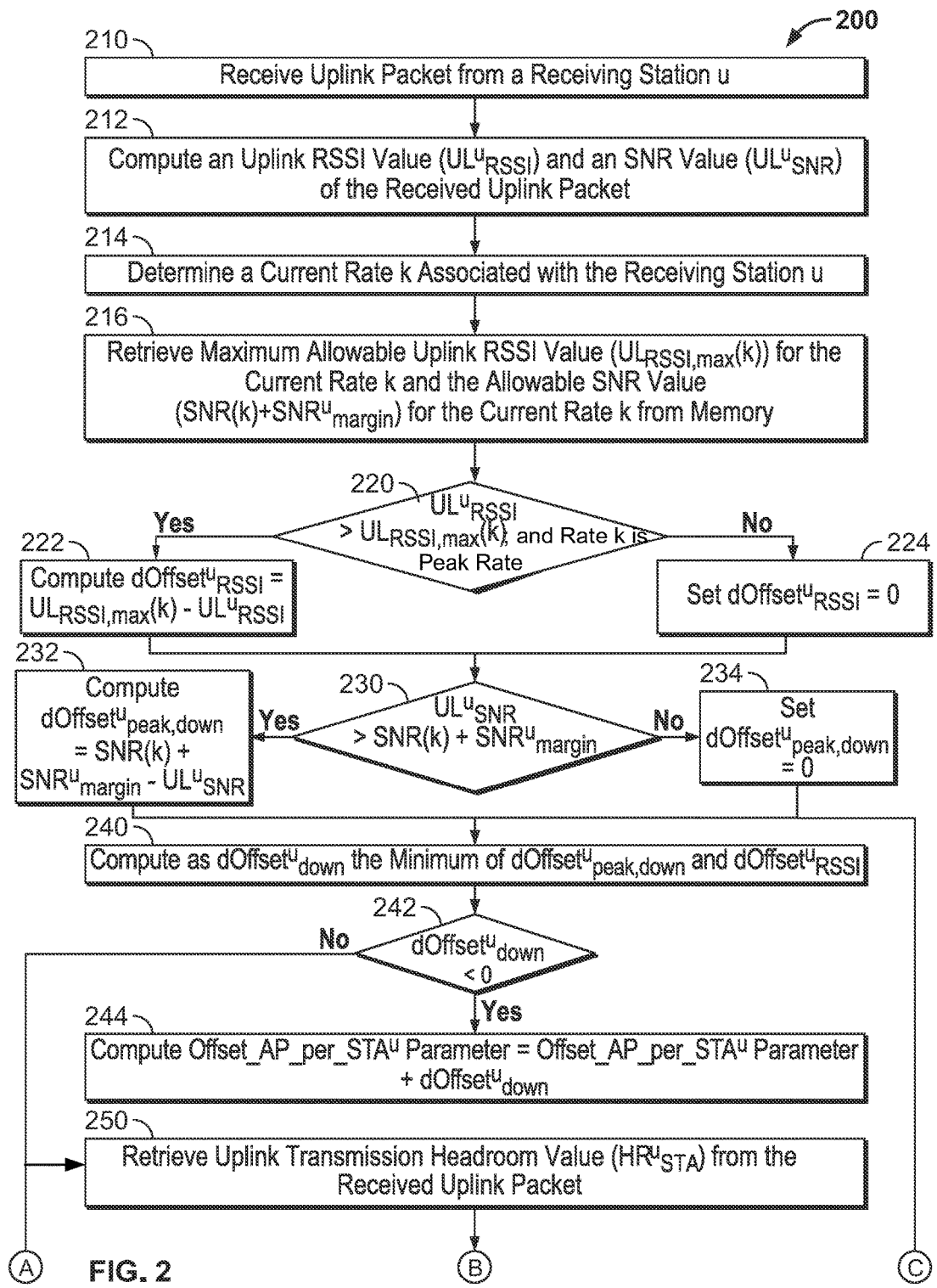
FIG. 2 shows an exemplary flowchart of a process for adaptively controlling uplink communications parameters of a receiving station by an access point in accordance with various embodiments.
Figure 2:
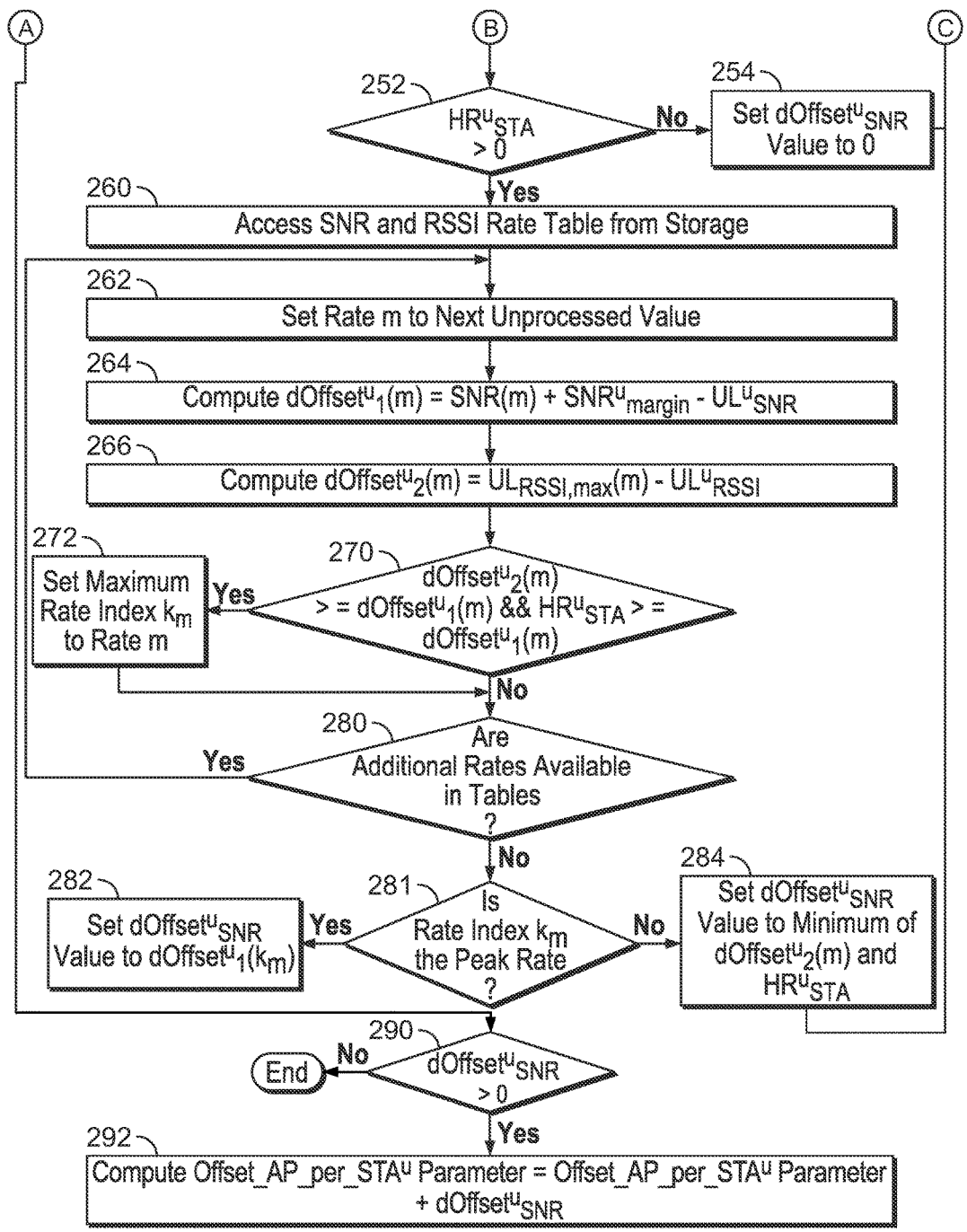

FIG. 2 shows an exemplary flowchart of a process 200 for adaptively controlling uplink communications parameters of a receiving station by an access point in accordance with various embodiments. At 210, an uplink packet is received by an access point from a receiving station u. For example, access point 110 may receive an uplink packet (transmitted in response to a trigger frame from access point 110) from receiving station 120a.

At 212, an uplink RSSI value (UL$^u_{RSSI}$) and an SNR value (UL$^u_{SNR}$) of the received uplink packet is computed by access point 110.

At 214, a current rate k associated with the receiving station u is determined by access point 110.

At 216, maximum allowable uplink RSSI value (UL$_{RSSI,max}$(k)) for the current rate k and the required SNR value (SNR(k)+SNR$^u_{margin}$) for the current rate k are retrieved from memory. For example, control circuitry 111 of access point 110 may retrieve these values from the rate tables stored in storage device 114.

At 220, access point 110 determines whether uplink RSSI value UL$^u_{RSSI}$ is greater than the maximum allowable uplink RSSI value UL$_{RSSI,max}$(k) and whether the rate k is the peak rate. For example, control circuitry 111 may search the retrieved rate tables and retrieve the maximum allowable uplink RSSI value for the current rate k and compare that retrieved value to the computed RSSI value of the uplink packet. In response to determining that uplink RSSI value UL$^u_{RSSI}$ is greater than the maximum allowable uplink RSSI value UL$_{RSSI,max}$(k) and rate k is the peak rate, the process proceeds to 222; otherwise the process proceeds to 224.

At 222, access point 110 computes dOffset$^u_{RSSI}$ = UL$_{RSSI,max}$(k)−UL$^u_{RSSI}$.

At 224, access point 110 sets dOffset$^u_{RSSI}$=0.

At 230, access point 110 determines whether the uplink SNR value (UL$^u_{SNR}$) is greater than the SNR for the current rate (k) as optionally adjusted by the margin for the receiving station u, e.g., SNR(k)+SNR$^u_{margin}$. In response to determining that the uplink SNR value (UL$^u_{SNR}$) is greater than the SNR for the rate as optionally adjusted by the margin for the receiving station u (SNR(k)+SNR$^u_{margin}$), the process proceeds to 232; otherwise the process proceeds to 234.

At 232, access point 110 computes dOffset$^u_{peak,down}$ = SNR(k)+SNR$^u_{margin}$−UL$^u_{SNR}$.

At 234, access point 110 sets dOffset$^u_{peak,down}$ to be equal to 0.

Continuing on with 240, access point 110 computes as dOffset$^u_{down}$ the minimum of dOffset$^u_{peak,down}$ and dOffset$^u_{RSSI}$.

At 242, access point 110 determines whether $dOffset^u_{down}$ is less than 0 (or is a negative value). In response to determining that $dOffset^u_{down}$ is less than 0, the process proceeds to 244; otherwise the process proceeds to 290, which is described further below. Or alternatively, when $dOffset^u_{down}$ is no less than 0, the process may proceed to 250.

At 244, access point 110 computes offset_AP_per_STA$^u$ parameter=offset_AP_per_STA$^u$ parameter+$dOffset^u_{down}$.

At 250, access point 110 retrieves uplink transmission headroom value ($HR^u_{STA}$) from the received uplink packet.

Continuing on with 252, access point 110 determines whether the uplink transmission headroom value ($HR^u_{STA}$) is greater than 0. In response to determining that the uplink transmission headroom value ($HR^u_{STA}$) is greater than 0, the process proceeds to 260; otherwise the process proceeds to 254, where access point 110 sets $dOffset^u_{SNR}$ value to 0.

At 260, access point 110 accesses SNR and RSSI rate table from storage device 114.

At 262, access point 110 sets rate m to next unprocessed value.

At 264, access point 110 computes $dOffset^u_1(m)$=SNR(m)+$SNR^u_{margin}$−$UL^u_{SNR}$.

At 266, access point 110 computes $dOffset^u_2(m)$= $UL_{RSSI,max}(m)$−$UL^u_{RSSI}$.

At 270, access point 110 determines whether $dOffset^u_2(m)$ is greater than or equal to $dOffset^u_1(m)$ and whether $HR^u_{STA}$ is greater than or equal to $dOffset^u_1(m)$. In response to determining that $dOffset^u_2(m)$ is greater than or equal to $dOffset^u_1(m)$ and $HR^u_{STA}$ is greater than or equal to $dOffset^u_1(m)$, the process proceeds to 272; otherwise the process proceeds to 280.

At 272, access point 110 sets the maximum rate index $k_m$ to rate m.

At 280, access point 110 determines whether additional rates are available in the rate tables. In response to determining that additional rates are available, the process proceeds to 262 to set rate m to the next unprocessed value; otherwise the process proceeds to 284.

At 281, access point 110 determines whether the rate index $k_m$ is the peak rate. In response to determining that rate index $k_m$ is the peak rate, the process proceeds to 282; otherwise the process proceeds to 284.

At 282, access point 110 sets $dOffset^u_{SNR}$ value to be equal to $dOffset^u_1(k_m)$.

At 284, access point 110 sets $dOffset^u_{SNR}$ value to be equal to a minimum of $dOffset^u_2(m)$ and $HR^u_{STA}$.

Continuing on with 290, access point 110 determines whether $dOffset^u_{SNR}$ is greater than 0 (or is a positive value). In response to determining that $dOffset^u_{SNR}$ is greater than 0, the process proceeds to 292; otherwise the process ends. In some embodiments, access point 110 repeats process 200 at this point for another receiving station 120n.

At 292, access point 110 computes offset_AP_per_STA$^u$ parameter=offset_AP_per_STA$^u$ parameter+$dOffset^u_{SNR}$.

In some embodiments, access point 110 computes a data rate parameter for each receiving station 120a-n. To compute the data rate parameter, access point 110 determines whether uplink transmission power was decreased (e.g., the target RSSI was reduced) by determining whether $dOffset^u_{down}$ is less than 0. In such circumstances, access point 110 may not change the current data rate k. If the uplink transmission power was not decreased, access point 110 may determine whether power was increased by determining whether $dOffset^u_{SNR}$ is greater than 0. In such circumstances, access point 110 may set the data rate to be the maximum data rate $k_m$ identified in 240, 242, 244, 246, 250 and 252 (FIG. 2). If the uplink transmission power was unchanged, access point 110 may search for a maximum data rate at which the required SNR value at that data rate optionally adjusted by the receiving station specific margin SNR value is less than the uplink SNR value of the received uplink packet. Access point 110 may set the data rate uplink communications parameter to this identified maximum data rate.

In some embodiments, access point 110 may compute an SNR margin value for each receiving station 120a-n and for each uplink AMPDU of the receiving station that is received. This SNR margin value may be adjusted on an on-going basis or may be set to a certain value and remain unchanged. In some implementations, the SNR margin value may be the same for every rate or may be different for different rates.

In some implementations, the SNR margin value may be initially set to 0. Access point 110 may compute the MPDU reception error rate in a current AMPDU uplink packet received from a given station. The error rate may be computed in accordance with the following where u represents a given receiving station 120a-n:

$$PER^u_{MPDU}=(\text{\# MPDU in error})/(\text{\# MPDU in the AMPDU}) \quad (9)$$

Assuming the current error rate is k, access point 110 may determine whether the computed $PER^u_{MPDU}$ is greater than a target PER value. If the $PER^u_{MPDU}$ is greater than the target PER value, access point 110 may increase the SNR margin value by a step_up_margin(k) for the given rate. Otherwise, if the $PER^u_{MPDU}$ is less than or equal to the target PER value, access point 110 may decrease the SNR margin value by a step_down_margin(k) for the given rate. In some implementations, the step_up_margin(k) and step_down_margin(k) values may be user defined parameters to adjust the SNR margin. In some implementations, the step_up_margin(k) and step_down_margin(k) values may be computed as a function of a PER target value. For example, step_down_margin(k) may initially be set to a user specified value or predetermined value and adjusted by (multiplied by) $PER_{target}(k)/(1-PER_{target}(k))$, where $PER_{target}(k)$ is the target error rate for a given rate k. The step_up_margin(k) may be correlated with the PER of the MPDU in the current AMPDU data packet. For example, the step_up_margin(k) may be computed in accordance with the following, where c is a parameter used to control the speed of adaptation and may also be determined by the number of MPDUs in the AMPDU:

$$\text{step\_up\_margin}(k)=c*PER^u_{MPDU}/PER_{target}(k) \quad (10)$$

In some embodiments, access point 110 may reduce the resource unit size of a given receiving station 120a-n in response to determining that the particular receiving station is operating at the lowest data rate and on maximum uplink transmission power. Access point 110 may step up the resource unit size and allocation assigned to that receiving station and transmit the new resource unit size and allocation to the receiving station as an adjusted uplink communications parameter in, for example, a trigger frame.

The adaptation of the SNR margin, offset_AP_per_STA, and rate may be different for each receiving station 120a-n (e.g., each receiving station may have a different update period). In some implementations, the adaptation of these and other uplink communications parameters may be performed for each receiving station at the same time. Although, this disclosure discusses updating or adjusting the uplink communications parameters using a target frame that is transmitted simultaneously to each receiving station, other methods and processes may be employed to update or adjust the uplink communications parameters. For example, access point 110 may transmit a downlink data frame specific to each receiving station with instructions to adjust the power, rate and/or other uplink communications parameter. The discussion pertaining to adjustments to the uplink communications parameters by access point 110 described in this disclosure may be performed in uplink OFDMA systems and uplink MUMIMO systems in similar ways.

Figure 3:
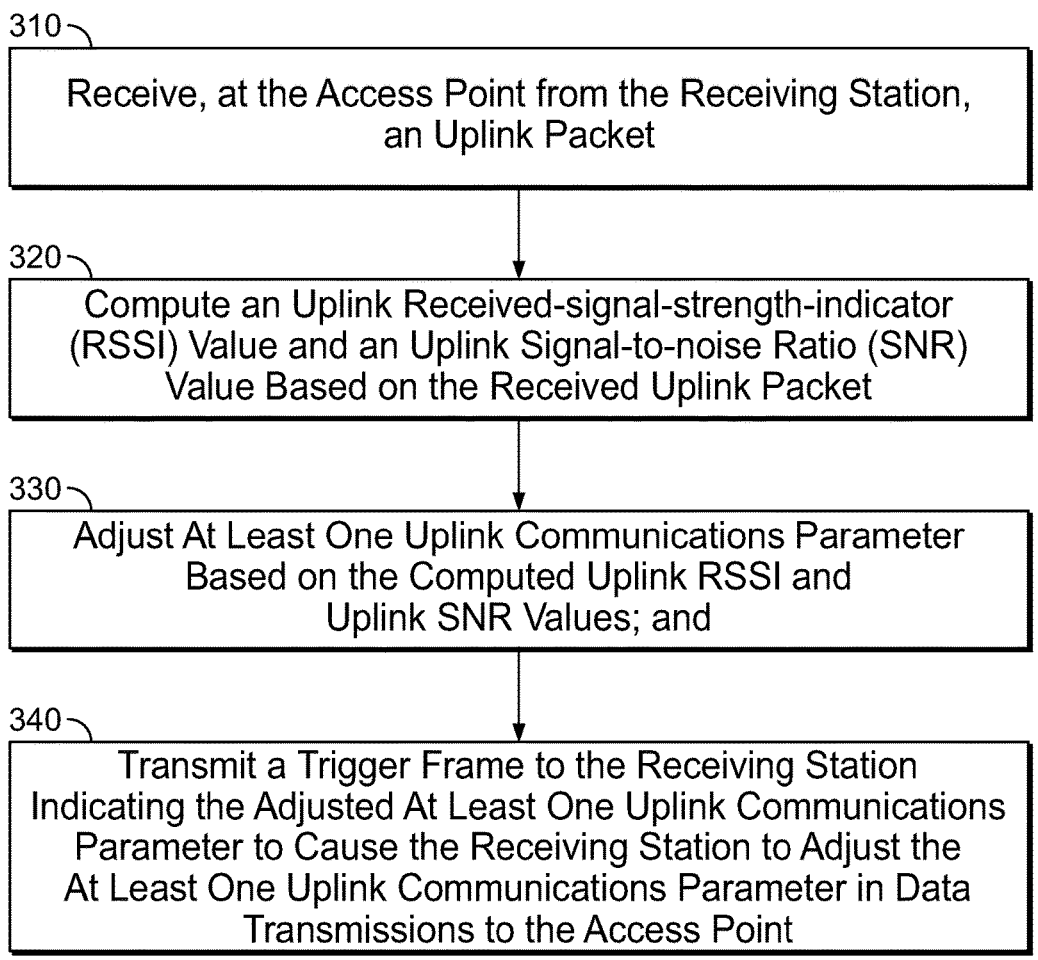
FIG. 3 shows an exemplary flowchart of a process for adaptively controlling uplink communications parameters of a receiving station by an access point in accordance with various embodiments.

FIG. 3 shows an exemplary flowchart of a process 300 for adaptively controlling uplink communications parameters of a receiving station by an access point in accordance with various embodiments. At 310, an uplink packet is received at the access point from the receiving station.

At 320, an uplink received-signal-strength-indicator (RSSI) value and an uplink signal-to-noise ratio (SNR) value are computed based on the received uplink packet.

At 330, at least one uplink communications parameter is adjusted based on the computed uplink RSSI and uplink SNR values.

At 340, a trigger frame is transmitted to the receiving station indicating the adjusted at least one uplink communications parameter to cause the receiving station to adjust the at least one uplink communications parameter in data transmissions to the access point.

Various embodiments discussed in conjunction with FIG. 1 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., devices in FIG. 1), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for an access point to adaptively control uplink communications parameters of a receiving station, the method comprising:
   receiving, at the access point from the receiving station, an uplink packet;
   computing an uplink received-signal-strength-indicator (RSSI) value and an uplink signal-to-noise ratio (SNR) value based on the received uplink packet;
   adjusting at least one uplink communications parameter based on the computed uplink RSSI and uplink SNR values; and
   transmitting a trigger frame to the receiving station, the trigger frame i) indicating the adjusted at least one uplink communications parameter and ii) causing the receiving station to adjust the at least one uplink communications parameter in data transmissions to the access point.

2. The method of claim 1, wherein the uplink communications parameter includes at least one of a target RSSI value, a rate, resource unit size, and resource unit location.

3. The method of claim 2 further comprising:
   causing the receiving station to compute a current uplink transmission power, for transmitting signals to the access point, based on the target RSSI value by:
      retrieving from the trigger frame a downlink transmission power corresponding to a power used by the access point to transmit signals to the receiving station;
      computing a downlink RSSI value based on the trigger frame;
      computing a pathloss value based on a difference of the downlink transmission power and the downlink RSSI value; and
      computing the current uplink transmission power based on a sum of the pathloss value and the target RSSI value;
   causing the receiving station to compute an uplink headroom value based on a difference of a maximum transmission power of the receiving station and the current uplink transmission power value; and
   receiving, at the access point, from the receiving station the uplink power headroom value.

4. The method of claim 1, wherein the adjusted at least one uplink communications parameter corresponds to an uplink transmission power, further comprising:
   determining availability to reduce the uplink transmission power corresponding to the at least one uplink communications parameter based on determining that at least one of (a) the uplink RSSI value, computed based on the received uplink packet, is greater than a maximum uplink RSSI value and (b) the uplink SNR value, computed based on the received uplink packet, is greater than a required SNR value of a peak rate; and
   reducing the at least one uplink communications parameter by a minimum of a difference between (a) the uplink RSSI value, computed based on the received uplink packet, and the maximum uplink RSSI value and (b) the uplink SNR value, computed based on the received uplink packet, and the required SNR value.

5. The method of claim 1 further comprising:
   receiving, at the access point from the receiving station, an uplink power headroom value that represents a difference between a maximum uplink transmission power of the receiving station and a current uplink transmission power of the receiving station;

in response to determining that reducing uplink transmission power is not available, searching for a maximum uplink rate that avoids saturating signals at the access point and for an amount to increase uplink power without exceeding the uplink power headroom value; and adjusting the at least one uplink communications parameter based on the maximum uplink rate and the amount to increase uplink power.

6. The method of claim 5, wherein searching for the maximum uplink rate comprises:

for each uplink rate of a plurality of uplink rates:
computing a first offset value based a difference between a required SNR value at the uplink rate and the uplink SNR value computed based on the received uplink packet; and
computing a second offset value based on a difference between a maximum uplink RSSI value at the uplink rate and the uplink RSSI value computed based on the received uplink packet;

searching for each of the computed first and second offset values to identify the maximum uplink rate of the plurality of uplink rates where (a) the second offset value at the maximum uplink rate is greater than or equal to the first offset value at the maximum uplink rate and (b) the uplink power headroom value is greater than or equal to the first offset value at the maximum uplink rate.

7. The method of claim 6 further comprising:

in response to determining that the maximum uplink rate is a peak uplink rate:
setting the uplink rate to the peak uplink rate; and
setting the amount to increase uplink power to the first offset value at the peak uplink rate;

in response to determining that the maximum uplink rate is not the peak uplink rate:
setting the uplink rate to the identified maximum uplink rate; and
setting the amount to increase uplink power to a minimum of the second offset value at the maximum uplink rate and the uplink power headroom value.

8. The method of claim 1 further comprising:

in response to determining that modifying uplink transmission power is not available:
comparing the uplink SNR value, computed based on the received uplink packet, to each of a plurality of required SNR values at different respective uplink rates;
in response to the comparing, selecting a maximum uplink rate of the uplink rates where the uplink SNR value, computed based on the received uplink packet, is greater than the required SNR value at the maximum uplink rate; and
adjusting the at least one uplink communications parameter based on the maximum uplink rate.

9. The method of claim 8, wherein determining that modifying the uplink transmission power is not available comprises:

receiving, at the access point from the receiving station, an uplink power headroom value that represents a difference between a maximum uplink transmission power of the receiving station and a current uplink transmission power of the receiving station;
determining that the uplink power headroom value is not positive; and determining that (a) the uplink RSSI value, computed based on the received uplink packet, is less than or equal to a maximum uplink RSSI value and (b) the uplink SNR value, computed based on the received uplink packet, is less than or equal to an required SNR value.

10. The method of claim 8, wherein the required SNR value comprises a margin SNR value computed based on an error rate of the received uplink packet.

11. A system for an access point to adaptively control uplink communications parameters of a receiving station, the system comprising:

control circuitry configured to:
receive, at the access point from the receiving station, an uplink packet;
compute an uplink received-signal-strength-indicator (RSSI) value and an uplink signal-to-noise ratio (SNR) value based on the received uplink packet;
adjust at least one uplink communications parameter based on the computed uplink RSSI and uplink SNR values; and
transmit a trigger frame to the receiving station, the trigger frame i) indicating the adjusted at least one uplink communications parameter and ii) causing the receiving station to adjust the at least one uplink communications parameter in data transmissions to the access point.

12. The system of claim 11, wherein the uplink communications parameter includes at least one of a target RSSI value, a rate, resource unit size, and resource unit location.

13. The system of claim 12, wherein the control circuitry is further configured to:

cause the receiving station to compute a current uplink transmission power, for transmitting signals to the access point, based on the target RSSI value by:
retrieving from the trigger frame a downlink transmission power corresponding to a power used by the access point to transmit signals to the receiving station;
computing a downlink RSSI value based on the trigger frame;
computing a pathloss value based on a difference of the downlink transmission power and the downlink RSSI value; and
computing the current uplink transmission power based on a sum of the pathloss value and the target RSSI value;

cause the receiving station to compute an uplink headroom value based on a difference of a maximum transmission power of the receiving station and the current uplink transmission power value; and
receive, at the access point, from the receiving station the uplink power headroom value.

14. The system of claim 11, wherein the adjusted at least one uplink communications parameter corresponds to an uplink transmission power, and wherein the control circuitry is further configured to:

determine availability to reduce the uplink transmission power corresponding to the at least one uplink communications parameter based on determining that at least one of (a) the uplink RSSI value, computed based on the received uplink packet, is greater than a maximum uplink RSSI value and (b) the uplink SNR value, computed based on the received uplink packet, is greater than a required SNR value of a current peak rate; and reduce the at least one uplink communications parameter by a minimum of a difference between (a) the uplink RSSI value, computed based on the received uplink packet, and the maximum uplink RSSI value and (b) the uplink SNR value, computed based on the received uplink packet, and the required SNR value of the current peak rate.

15. The system of claim 11, wherein the control circuitry is further configured to:
receive, at the access point from the receiving station, an uplink power headroom value that represents a difference between a maximum uplink transmission power of the receiving station and a current uplink transmission power of the receiving station;
in response to determining that reducing uplink transmission power is not available, search for a maximum uplink rate that avoids saturating signals at the access point and for an amount to increase uplink power without exceeding the uplink power headroom value; and
adjust the at least one uplink communications parameter based on the maximum uplink rate and the amount to increase uplink power.

16. The system of claim 15, wherein the control circuitry is further configured to search for the maximum uplink rate by:
for each uplink rate of a plurality of uplink rates:
computing a first offset value based on a difference between a required SNR value at the uplink rate and the uplink SNR value computed based on the received uplink packet; and
computing a second offset value based on a difference between a maximum uplink RSSI value at the uplink rate and the uplink RSSI value computed based on the received uplink packet;
searching for each of the computed first and second offset values to identify the maximum uplink rate of the plurality of uplink rates where (a) the second offset value at the maximum uplink rate is greater than or equal to the first offset value at the maximum uplink rate and (b) the uplink power headroom value is greater than or equal to the first offset value at the maximum uplink rate.

17. The system of claim 16, wherein the control circuitry is further configured to:
in response to determining that the maximum uplink rate is a peak uplink rate:
set the uplink rate to the peak uplink rate; and
set the amount to increase uplink power to the first offset value at the peak uplink rate;
in response to determining that the maximum uplink rate is not the peak uplink rate:
set the uplink rate to the identified maximum uplink rate; and
set the amount to increase uplink power to a minimum of the second offset value at the maximum uplink rate and the uplink power headroom value.

18. The system of claim 11, wherein the control circuitry is further configured to:
in response to determining that modifying uplink transmission power is not available:
compare the uplink SNR value, computed based on the received uplink packet, to each of a plurality of required SNR values at different respective uplink rates;
in response to the comparing, select a maximum uplink rate of the uplink rates where the uplink SNR value, computed based on the received uplink packet, is greater than the required SNR value at the maximum uplink rate; and
adjust the at least one uplink communications parameter based on the maximum uplink rate.

19. The system of claim 18, wherein the control circuitry is further configured to determine that modifying the uplink transmission power is not available by:
receiving, at the access point from the receiving station, an uplink power headroom value that represents a difference between a maximum uplink transmission power of the receiving station and a current uplink transmission power of the receiving station;
determining that the uplink power headroom value is not positive; and
determining that (a) the uplink RSSI value, computed based on the received uplink packet, is less than or equal to a maximum uplink RSSI value and (b) the uplink SNR value, computed based on the received uplink packet, is less than or equal to a required SNR value of the peak rate.

20. The system of claim 18, wherein the required SNR value comprises a margin SNR value computed based on an error rate of the received uplink packet.

* * * * *